United States Patent
Okuhara et al.

(10) Patent No.: US 9,252,576 B2
(45) Date of Patent: Feb. 2, 2016

(54) CORRUGATED TUBE WITH PATH-MAINTAINING MEMBER AND WIRE HARNESS

(75) Inventors: Takashi Okuhara, Mie (JP); Takeharu Ito, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 38 days.

(21) Appl. No.: 14/122,136

(22) PCT Filed: Oct. 17, 2011

(86) PCT No.: PCT/JP2011/073792
§ 371 (c)(1),
(2), (4) Date: Nov. 25, 2013

(87) PCT Pub. No.: WO2012/172700
PCT Pub. Date: Dec. 20, 2012

(65) Prior Publication Data
US 2014/0090886 A1 Apr. 3, 2014

(30) Foreign Application Priority Data
Jun. 17, 2011 (JP) .................. 2011-134791

(51) Int. Cl.
*H02G 3/04* (2006.01)
*F16L 11/11* (2006.01)
*F16L 11/15* (2006.01)
*H01B 7/18* (2006.01)
*B60R 16/02* (2006.01)
*F16L 27/10* (2006.01)
*H01P 3/06* (2006.01)

(52) U.S. Cl.
CPC .......... *H02G 3/0468* (2013.01); *B60R 16/0215* (2013.01); *F16L 11/11* (2013.01); *F16L 11/15* (2013.01); *H01B 7/1815* (2013.01); *H02G 3/0481* (2013.01); *F16L 27/10* (2013.01); *H01P 3/06* (2013.01)

(58) Field of Classification Search
CPC ............. H01B 7/00–7/26; H01B 7/28–7/295; H01B 7/30–7/428; H01B 13/012–13/344
See application file for complete search history.

(56) References Cited

U.S. PATENT DOCUMENTS

| 2,401,760 | A | * | 6/1946 | Heyroth ...................... 264/221 |
| 2,731,672 | A | * | 1/1956 | Davis et al. ................... 264/132 |
| 3,691,488 | A | * | 9/1972 | Holtum, Jr. ........ H01B 11/1808 29/600 |

(Continued)

FOREIGN PATENT DOCUMENTS

| GB | 1022847 | * | 3/1966 | ............... H01P 3/06 |
| JP | H4-86022 | * | 7/1992 | |

(Continued)

OTHER PUBLICATIONS

International Search Report, mail date is Nov. 8, 2011.

Primary Examiner — Jeremy C Norris
Assistant Examiner — Muhammed Azam
(74) Attorney, Agent, or Firm — Greenblum & Bernstein, P.L.C.

(57) ABSTRACT

A corrugated tube assembly including a corrugated tube provided with a path-maintaining member. The corrugated tube has annular convex portions and annular concave portions alternately formed along a longitudinal direction. The path-maintaining member is a long member die-molded to maintain a shape at least a portion of which is bent in the longitudinal direction, and that is attached to the corrugated tube along the longitudinal direction thereof.

4 Claims, 3 Drawing Sheets

(56) References Cited

U.S. PATENT DOCUMENTS

| | | | | |
|---|---|---|---|---|
| 4,384,167 A | * | 5/1983 | Nestor | H02G 3/0468 174/135 |
| 4,569,457 A | * | 2/1986 | Hatakeyama et al. | 215/364 |
| 4,791,963 A | * | 12/1988 | Gronert | F16L 11/115 138/106 |
| 4,970,351 A | * | 11/1990 | Kirlin | 174/68.3 |
| 6,034,329 A | * | 3/2000 | Kawamura | 174/102 R |
| 6,488,053 B1 | * | 12/2002 | Tadokoro | H02G 3/0468 138/110 |
| 2002/0179318 A1 | * | 12/2002 | Seo | H02G 3/0468 174/71 R |
| 2002/0198502 A1 | * | 12/2002 | Vohsing | A61J 15/0015 604/270 |
| 2009/0000682 A1 | * | 1/2009 | Kisu | F16L 3/26 138/121 |
| 2010/0080952 A1 | * | 4/2010 | Suzuki et al. | 428/113 |
| 2014/0231135 A1 | * | 8/2014 | Okuhara | 174/99 R |

FOREIGN PATENT DOCUMENTS

| | | | | |
|---|---|---|---|---|
| JP | 5-10110 | | 2/1993 | |
| JP | H1098819 | * | 4/1998 | H02G 3/04 |
| JP | 2000-184551 | | 6/2000 | |
| JP | 2002-64917 | | 2/2002 | |
| JP | 2006-296166 | * | 10/2006 | H02G 3/04 |
| JP | 2006-320181 | | 11/2006 | |
| JP | 2010-178480 | * | 8/2010 | H02G 3/04 |

* cited by examiner

CORRUGATED TUBE WITH PATH-MAINTAINING MEMBER AND WIRE HARNESS

TECHNICAL FIELD

The present invention relates to a technology keeping a path of an electric wire constant while covering the electric wire.

TECHNICAL BACKGROUND

Conventionally, as disclosed in Patent Documents 1-4, a technology is known in which a wire harness installed in a vehicle and the like is covered by a corrugated tube with good flexibility.

RELATED ART

Patent Literature

Patent Document 1: Japanese Utility Model Laid-Open Publication No. H4-86022
Patent Document 2: Japanese Patent Laid-Open Publication No. 2000-184551
Patent Document 3: Japanese Patent Laid-Open Publication No. 2002-64917
Patent Document 4: Japanese Patent Laid-Open Publication No. 2006-296166

SUMMARY OF THE INVENTION

Problems to be Solved by the Invention

However, because the corrugated tube itself has superior flexibility, the corrugated tube itself does not have a function of keeping a path of the wire harness constant. Therefore, it is necessary to keep the path of the wire harness constant by fixing clamping members that are attached to the wire harness or the corrugated tube to certain positions in the vehicle. When the number of places where the clamping members are fixed increases, there is a risk of causing an increase in parts cost, an increase in installation cost, and the like.

Here, by using a gutter-shaped resin molded product (protector) formed into a three-dimensional shape conforming with an installation location of the wire harness, the path of the wire harness can be kept constant while the wire harness is protected.

However, in order to form the resin molded product capable of protecting the wire harness into a three-dimensional shape conforming with the installation location of the wire harness, a mold shape of the resin molded product becomes complicated. Therefore, manufacturing cost increases.

Therefore, a purpose of the present invention is to enable, at a lower cost, a path of an electric wire to be kept constant while covering the electric wire.

Means for Solving the Problems

To achieve the above purpose, a fifth aspect is provided with a corrugated tube that has annular convex portions and annular concave portions alternately formed along a longitudinal direction; and a path-maintaining member that is a long member die-molded to maintain a shape at least a portion of which is bent along the longitudinal direction, and that is attached to the corrugated tube along the longitudinal direction. A slit is formed on the corrugated tube along the longitudinal direction, and the path-maintaining member includes a first portion where a pair of concave grooves housing edge portions of the corrugated tube on both sides of the slit are formed; and a second portion having a lid portion covering a portion of the corrugated tube on an outer side of the slit, and a protruding bar portion protruding at a width-direction center part of the lid portion and arranged in the slit. The second portion is more sharply bent than the first portion.

To achieve the above purpose, a sixth aspect is provided with a corrugated tube that has annular convex portions and annular concave portions alternately formed along a longitudinal direction; and a path-maintaining member that is a long member die-molded to maintain a shape at least a portion of which is bent along the longitudinal direction, and that is attached to the corrugated tube along the longitudinal direction. A slit is formed on the corrugated tube along the longitudinal direction, and the path-maintaining member includes a first portion where a pair of concave grooves housing edge portions of the corrugated tube on both sides of the slit are formed; and a second portion having a lid portion covering a portion of the corrugated tube on an outer side of the slit, and a protruding bar portion protruding at a width-direction center part of the lid portion and arranged in the slit. The first portion is more sharply bent than the second portion.

A wire harness according to a seventh aspect includes the corrugated tube with the path-maintaining member according to the fifth or sixth aspects, and a wire harness main body having at least one electric wire and inserted into the corrugated tube with the path-maintaining member.

Effect of the Invention

According to the fifth or sixth aspect, the electric wire can be covered by the corrugated tube and the path of the electric wire can be kept constant by the path-maintaining member attached to the corrugated tube. The path-maintaining member itself is not required to cover the electric wire. Therefore, the path-maintaining member itself can be formed to have a small and simple shape. Therefore, the path-maintaining member die-molded to maintain a shape at least a portion of which is bent in the longitudinal direction can be formed at a relatively low cost. Therefore, it is possible, at a lower cost, to keep the path of the electric wire constant while covering the electric wire.

In addition, the path-maintaining member is attached to the slit of the corrugated tube. Therefore, an attaching positional relationship between the corrugated tube and the path-maintaining member is stabilized and the corrugated tube is easily maintained in a desired shape.

According to the fifth aspect, for a portion where the path-maintaining member is relatively sharply bent, the path-maintaining member can be installed on the corrugated tube by arranging the protruding bar portion in the slit from the outer periphery side of the corrugated tube. Therefore, the operation of installing the path-maintaining member can be easily performed.

According to the sixth aspect, for a portion where the path-maintaining member is sharply bent, the edge portions of the corrugated tube on both sides of the slit are housed in the pair of concave grooves and an integrated state of the corrugated tube and the path-maintaining member is more reliably maintained.

According to the wire harness of the seventh aspect, the wire harness main body can be covered by the corrugated tube and a path of the wire harness main body can be kept constant by the path-maintaining member attached to the corrugated tube. The path-maintaining member itself is not required to cover the wire harness main body. Therefore, the path-maintaining member itself can be formed to have a small and simple shape. Therefore, the path-maintaining member die-molded to maintain a shape at least a portion of which is bent in the longitudinal direction can be formed at a relatively low cost. Therefore, it is possible, at a lower cost, to keep the path of the wire harness main body constant while covering the wire harness main body.

MODE FOR CARRYING OUT THE INVENTION

First Embodiment

Figure 1:
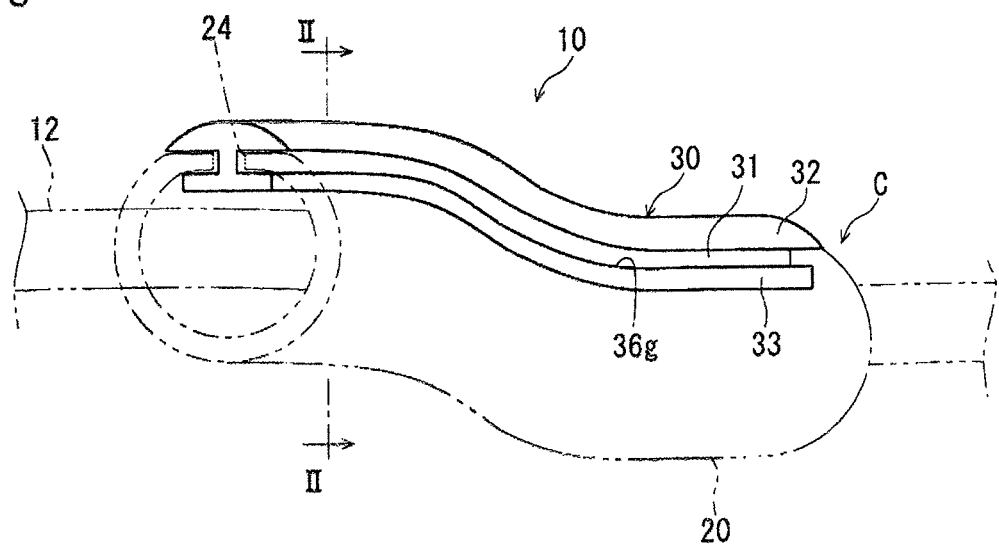
FIG. 1 is a schematic perspective view of a portion of a wire harness according to a first embodiment where a corrugated tube is installed.
Figure 2:
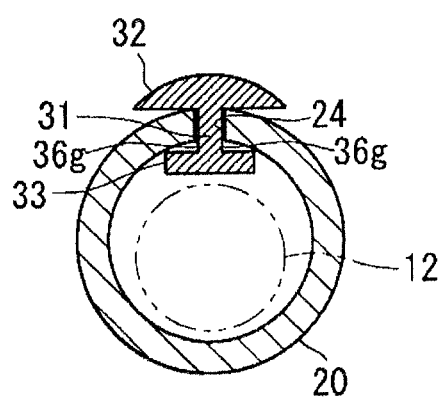
FIG. 2 is a schematic cross-sectional view along a line II-II of FIG. 1.
Figure 3:
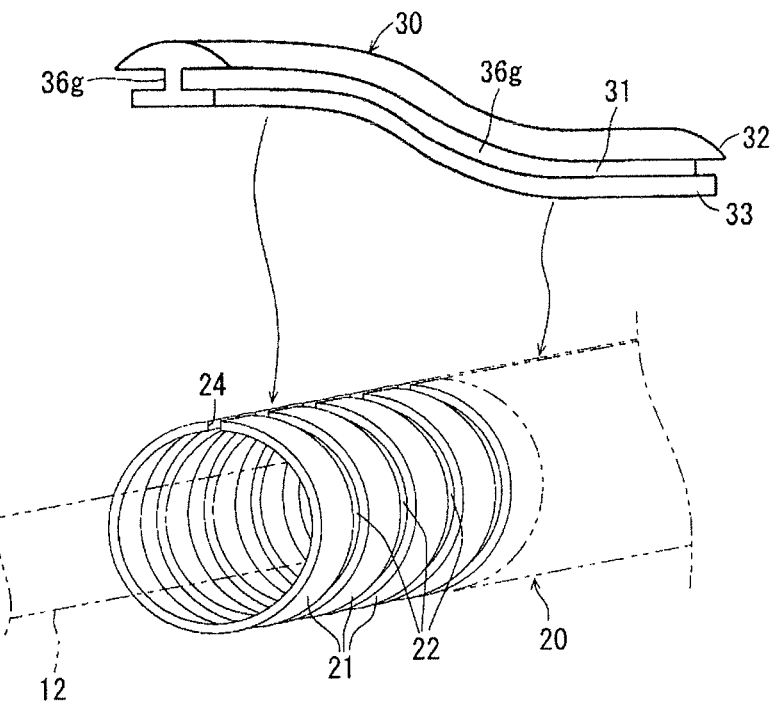
FIG. 3 is an explanatory diagram illustrating a process of attaching a path-maintaining member to the corrugated tube.

In the following, a wire harness and a corrugated tube with a path-maintaining member according to a first embodiment are described. FIG. 1 is a schematic perspective view of a portion of a wire harness 10 where a corrugated tube 20 is installed. FIG. 2 is a schematic cross-sectional view along a line II-II of FIG. 1. FIG. 3 is an explanatory diagram illustrating a process of attaching a path-maintaining member 30 to the corrugated tube 20.

The wire harness 10 includes a wire harness main body 12, a corrugated tube 20 and a path-maintaining member 30.

The wire harness main body 12 is formed as a configuration in which a plurality of electric wires are bound together. More specifically, the wire harness main body 12 is formed as a configuration in which a plurality of electric wires are bound together while being separated into branches according to a wiring format of a vehicle to which the wire harness is to be installed. It is not necessary that the wire harness main body 12 always have branches. Further, the wire harness main body 12 may also be configured by a single electric wire. Further, other optical cables and the like may also be bound together in the wire harness main body 12.

When the wire harness main body 12 is installed in a vehicle or the like, the wire harness main body 12 is bent along the wiring format of the vehicle or the like. In order to inhibit interference with peripheral parts and the like by the wire harness main body 12, the wire harness main body 12 may be maintained in a shape bent to follow the wiring format. In this case, the present corrugated tube with the path-maintaining member C is installed on the wire harness main body 12, and the wire harness main body 12 is maintained in a constant bent shape. With respect to the wire harness main body 12, the portion where the present corrugated tube with the path-maintaining member C is installed may be at least a part of the wire harness main body 12, and may be either a part of the wire harness main body 12 or almost the entire wire harness main body 12.

The corrugated tube 20 is a tubular member that has annular convex portions 21 and annular concave portions 22 alternately formed along the longitudinal direction (see FIG. 3), and is formed of a resin and the like. Such a corrugated tube 20 is easily elastically deformable due to stepped portions between the annular convex portions 21 and the annular concave portions 22, and thus the corrugated tube 20 itself as a whole has a property of being easily bent and deformed. Usually, the corrugated tube 20 has an inner diameter larger (usually slightly larger) than an outer diameter of the portion of the wire harness main body 12 where installation is to occur.

Further, a slit 24 is formed on one side of the corrugated tube 20 along the longitudinal direction. By opening up at the slit 24, the wire harness main body 12 can be easily arranged inside the corrugated tube 20.

The path-maintaining member 30 is a long member die-molded to maintain a shape at least a portion of which is bent in the longitudinal direction, and is formed of a resin such as P.P. (polypropylene). In other words, during die-molding, the path-maintaining member 30 is formed into a shape at least a portion of which is bent. The bent shape of the path-maintaining member 30 is configured into a shape corresponding to a wiring path where a portion of the wire harness main body 12 is installed, the portion being a portion where installation is to occur. In an example illustrated in FIG. 1, a longitudinal-direction middle portion of the path-maintaining member 30 is bent into a gentle S shape, and two end portions of the path-maintaining member 30 are formed in linear shapes. The portion of the path-maintaining member 30 that is formed into a bent shape may be the entire path-maintaining member 30 or a part of the path-maintaining member 30. Further, the portion that is formed into a bent shape may be formed into a shape bent in a plane or into a cubically (three-dimensionally) bent shape.

The path-maintaining member 30 is attached to the corrugated tube 20 along the longitudinal direction thereof. That is, the path-maintaining member 30 has a portion on which a pair of concave grooves 36g are formed capable of housing edge portions of the corrugated tube 20 on both sides of the slit 24. In other words, the path-maintaining member 30 has a configuration in which an outer periphery side projecting portion 32 is provided on an edge on one side (outer periphery side) of a long joining portion 31 and an inner periphery side projecting portion 33 is provided on an edge on another side (inner periphery side) of the joining portion 31 so that a cross-sectional shape of the path-maintaining member 30 in a plane orthogonal to the longitudinal direction exhibits a substantially H shape. An outer periphery surface of the outer periphery side projecting portion 32 exhibits an arc-shaped curving surface following the outer periphery surface of the corrugated tube 20. The concave grooves 36g are configured to have a width dimension substantially the same as or larger (slightly larger) than a thickness dimension of the corrugated tube 20 (more specifically, a difference between an outermost peripheral portion of the annular convex portions 21 and an innermost peripheral portion of the annular concave portions 22 in a radial direction of the corrugated tube 20). A depth dimension of the concave grooves 36g is not particularly limited insofar as the edge portions of the corrugated tube 20 can be housed in a state where the edge portions of the corrugated tube 20 are positioned in the radial direction.

The portion of the path-maintaining member 30 on which the pair of concave grooves 36g are formed may be the entire path-maintaining member 30 in the longitudinal direction and may also be a portion of the path-maintaining member 30 in the longitudinal direction. In the present embodiment, an example is described in which the pair of the concave grooves 36g are formed over the entire path-maintaining member 30 in the longitudinal direction.

The path-maintaining member 30 is attached to the corrugated tube 20 along the longitudinal direction thereof. Here, the path-maintaining member 30 is attached to the corrugated tube 20 as follows in a state arranged in the slit 24.

That is, by opening the corrugated tube 20 at the slit 24, the wire harness main body 12 is housed inside the corrugated tube 20. In this state, the corrugated tube 20 is opened at the slit 24 and the edge portions of the corrugated tube 20 on the two sides of the slit 24 are fitted into the pair of concave grooves 36g. In this state, the joining portion 31 is arranged in the slit 24, the outer periphery side projecting portion 32 is arranged on the outer side of the slit 24 along the outer periphery surface of the corrugated tube 20, and the inner periphery side projecting portion 33 is arranged on the inner side of the slit 24 along the inner periphery surface of the corrugated tube 20. As a result, the corrugated tube 20 is integrated with the path-maintaining member 30 in a state bent to follow the shape of the path-maintaining member 30.

After this, when necessary, a tie band, an adhesive tape or the like is wound on the outer periphery of the corrugated tube 20 so that a closed state of the corrugated tube 20 is maintained and an integrated state of the corrugated tube 20 and the path-maintaining member 30 is maintained. In addition to the above, the closed state of the corrugated tube 20 may also be maintained by a lock mechanism or the like provided on the corrugated tube 20 itself.

According to the corrugated tube with the path-maintaining member C and the wire harness 10 that are configured as described above, the wire harness main body 12 is covered and protected by the corrugated tube 20 and is maintained by the path-maintaining member 30 to follow a path that is bent into a predetermined shape. Therefore, by forming the path-maintaining member 30 into a shape conforming with the installation location of the wire harness main body 12, the wire harness main body 12 can maintain a constant path conforming with the installation location. The path-maintaining member 30 itself does not have a role in covering the wire harness main body 12 like a member referred to as a so-called protector, and thus can be formed to have a small and simple shape. Therefore, when manufacturing the path-maintaining member 30 that is die-molded to maintain a shape at least a portion of which is bent along the longitudinal direction, complication of a mold structure can be suppressed and the path-maintaining member 30 can be formed at a relatively low cost using a relatively simple mold structure. Therefore, it is possible, at a lower cost, to keep the path of the wire harness main body 12 constant while covering the wire harness main body 12. In particular, when the wire harness main body 12 is installed in a three-dimensionally bent state, a member for regulating the path of the wire harness main body 12 may have a complicated shape. Therefore, the present embodiment is effective for such a case.

Further, as a result of being able to maintain the wire harness main body 12 in a bent state, when the wire harness main body 12 is attached to a vehicle or the like, it is possible to reduce a number of attachment locations in the vehicle. In other words, even when the number of attachment locations of the corrugated tube with the path-maintaining member C is small, the wire harness main body 12 can be maintained in a constant bent state. Therefore, a number of clamping members and the like that are used for fixedly attaching the wire harness main body 12 and a number of attachment operations can be reduced and, from this point of view also, reduction in manufacturing cost and attachment operation cost of the corrugated tube with the path-maintaining member C can be achieved.

Further, the path-maintaining member 30 is attached to the corrugated tube 20 in the state arranged in the slit 24. Therefore, an attaching positional relationship between the corrugated tube 20 and the path-maintaining member 30 is stabilized. Therefore, the corrugated tube 20 is easily maintained in a desired shape along the shape of the path-maintaining member 30.

Further, the edge portions of the corrugated tube 20 on both sides of the slit 24 are respectively housed in the pair of concave grooves 36g. Therefore, the path-maintaining member 30 is inhibited from disengaging from the corrugated tube 20.

Further, the slit 24 is closed by the path-maintaining member 30. Therefore, a situation can be inhibited in which the wire harness main body 12 inside the corrugated tube 20 may escape to an exterior through the slit 24.

Second Embodiment

Figure 4:
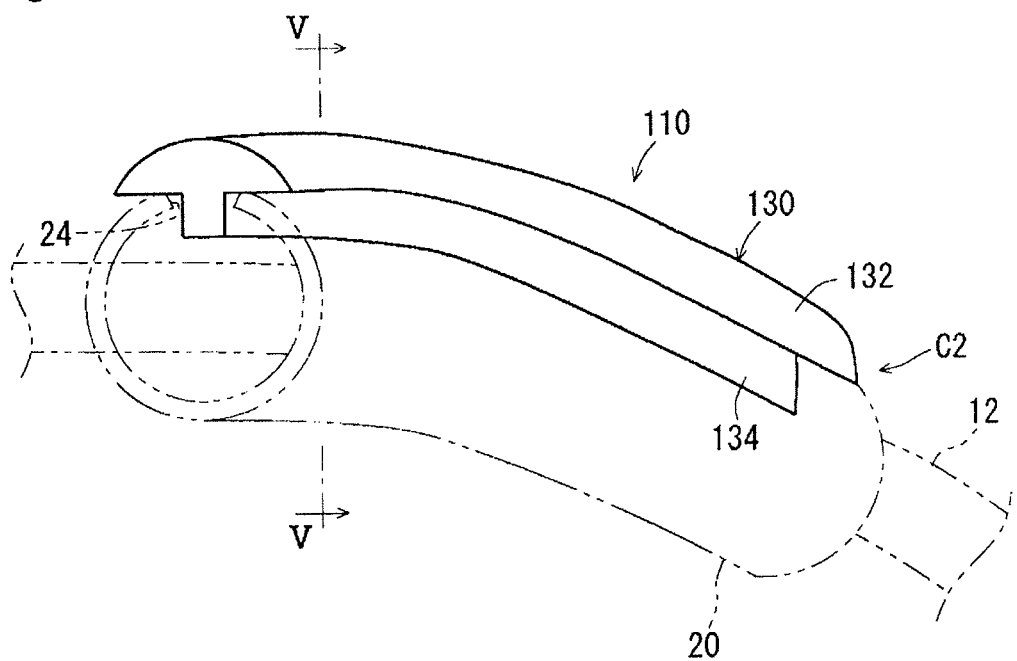
FIG. 4 is a schematic perspective view of a portion of a wire harness according to a second embodiment where a corrugated tube is installed.
Figure 5:
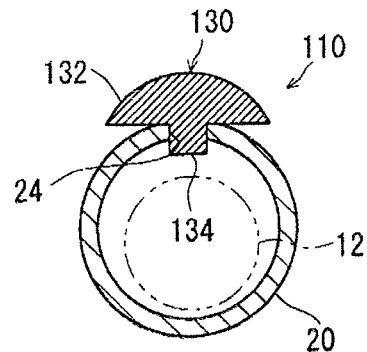
FIG. 5 is a schematic cross-sectional view along a line V-V of FIG. 4.

A wire harness and a corrugated tube with a path-maintaining member according to a second embodiment are described. FIG. 4 is a schematic perspective view of a portion of a wire harness 110 where the corrugated tube 20 is installed. FIG. 5 is a schematic cross-sectional view along a line V-V of FIG. 4. In the description of the present embodiment, configuration elements that are the same as those described in the first embodiment are indicated using the same reference numerals and the explanation thereof is omitted.

The wire harness 110 includes the wire harness main body 12, the corrugated tube 20 and a path-maintaining member 130.

The wire harness main body 12 and the corrugated tube 20 are the same as those described in the above embodiment.

The path-maintaining member 130 is a long member die-molded to maintain a shape at least a portion of which is bent in the longitudinal direction, and is formed of a resin such as P.P. (polypropylene). In other words, during die-molding, the path-maintaining member 130 is formed into a shape at least a portion of which is bent. In an example illustrated in FIG. 4, the entire path-maintaining member 130 is formed to gently bend in the longitudinal direction. The portion of the path-maintaining member 130 that is formed into a bent shape may be the entire path-maintaining member 130 or a part of the path-maintaining member 130. Further, the portion that is formed into a bent shape may be formed into a shape bent in a plane or into a cubically (three-dimensionally) bent shape.

The path-maintaining member 130 is attached to the corrugated tube 20 along the longitudinal direction thereof. Here, the path-maintaining member 130 has a lid portion 132 and a protruding bar portion 134 so that a cross-sectional shape of the path-maintaining member 130 in a plane orthogonal to the longitudinal direction exhibits a substantially T shape. More specifically, the lid portion 132 is formed into a long plate shape covering a portion of the corrugated tube 20 outside the slit 24. An outer periphery surface of the lid portion 132 exhibits an arc-shaped curving surface following the outer periphery surface of the corrugated tube 20. The protruding bar portion 134 is formed in a protruding bar shape protruding at a width-direction center part of the lid portion 132. At a front end portion of the protruding bar portion 134, a member projecting in the width direction is not provided. The front end portion of the protruding bar portion 134 may also be formed in a shape that gradually tapers toward a front end side thereof. The protruding bar portion 134 is configured to have a protruding dimension substantially the same as or larger (slightly larger) than a thickness dimension of the corrugated tube 20 (more specifically, a difference between an outermost peripheral portion of the annular convex portions 21 and an innermost peripheral portion of the annular concave portions 22 in the radial direction of the corrugated tube 20). However, the protruding dimension of the protruding bar portion 134 may also be smaller than the thickness of the corrugated tube 20.

The portion of the path-maintaining member 130 having the lid portion 132 and the protruding bar portion 134 may be the entire path-maintaining member 130 in the longitudinal direction and may also be a portion of the path-maintaining member 130 in the longitudinal direction. In the present embodiment, an example is described in which the portion having the lid portion 132 and the protruding bar portion 134 spans the entire path-maintaining member 130 in the longitudinal direction.

The path-maintaining member 130 is attached to the corrugated tube 20 as follows in a state arranged in the slit 24.

That is, by opening the corrugated tube 20 at the slit 24, the wire harness main body 12 is housed inside the corrugated tube 20. In this state, the corrugated tube 20 is opened at the slit 24 and the protruding bar portion 134 of the path-maintaining member 130 is fitted into the slit 24. Next, the protruding bar portion 134 is arranged in the slit 24 and the lid portion 132 is arranged on the outer side of the slit 24 along the outer periphery surface of the corrugated tube 20.

After this, when necessary, a tie band, an adhesive tape or the like is wound on the outer periphery of the corrugated tube 20 so that a closed state of the corrugated tube 20 is maintained and an integrated state of the corrugated tube 20 and the path-maintaining member 130 is maintained. In addition to the above, the closed state of the corrugated tube 20 may also be maintained by a lock mechanism or the like provided on the corrugated tube 20 itself. As a result, the corrugated tube 20 is integrated with the path-maintaining member 130 in a state bent to follow the shape of the path-maintaining member 130.

According to a corrugated tube with the path-maintaining member C2 and the wire harness 110 that are configured as described above, the wire harness main body 12 is covered and protected by the corrugated tube 20 and is maintained by the path-maintaining member 130 to follow a path that is bent into a predetermined shape. Therefore, by forming the path-maintaining member 130 into a shape conforming with the installation location of the wire harness main body 12, the wire harness main body 12 can keep a constant path conforming with the installation location. The path-maintaining member 130 itself does not have a role in covering the wire harness main body 12 like a member referred to as a so-called protector, and thus can be formed to have a small and simple shape. Therefore, when manufacturing the path-maintaining member 130 that is die-molded to maintain a shape at least a portion of which is bent along the longitudinal direction, complication of a mold structure can be suppressed and the path-maintaining member 130 can be formed at a relatively low cost using a relatively simple mold structure. Therefore, it is possible, at a lower cost, to keep the path of the wire harness main body 12 constant while covering the wire harness main body 12. In particular, when the wire harness main body 12 is installed in a three-dimensionally bent state, a member for regulating the path of the wire harness main body 12 may have a complicated shape. Therefore, the present embodiment is effective for such a case.

In addition, the path-maintaining member 130, lacking the inner periphery side projecting portion 33, is formed in a more simplified shape than the path-maintaining member 30 in the above embodiment. Therefore, when manufacturing the path-maintaining member 130, the path-maintaining member 130 can be formed at a relatively low cost using a simpler mold structure.

Further, the path-maintaining member 130 can be installed on the corrugated tube 20 by arranging the protruding bar portion 134 in the slit 24 from the outer periphery side of the corrugated tube 20. Therefore, the operation of installing the path-maintaining member 130 can be easily performed.

Further, for the same reason described in the above embodiment, the number of clamping members and the like that are used for fixedly attaching the wire harness main body 12 and the number of attachment operations can be reduced and, from this point of view also, reduction in manufacturing cost and attachment operation cost of the corrugated tube with the path-maintaining member C2 can be achieved.

Further, the path-maintaining member 130 is attached to the corrugated tube 20 in the state arranged in the slit 24. Therefore, an attaching positional relationship between the corrugated tube 20 and the path-maintaining member 130 is stabilized. Therefore, the corrugated tube 20 is easily maintained in a desired shape following the shape of the path-maintaining member 130.

Further, the protruding bar portion 134 is arranged in the slit 24 and the lid portion 132 is arranged on the outer side of the slit 24 on the outer periphery surface of the corrugated tube 20. Therefore, a positional relationship between the path-maintaining member 130 and the corrugated tube 20 can be further stabilized.

Modified Examples

A portion having the pair of concave grooves 36g as described in the first embodiment and a portion having the lid portion 132 and the protruding bar portion 134 as described in the second embodiment may coexist in one path-maintaining member.

Figure 6:
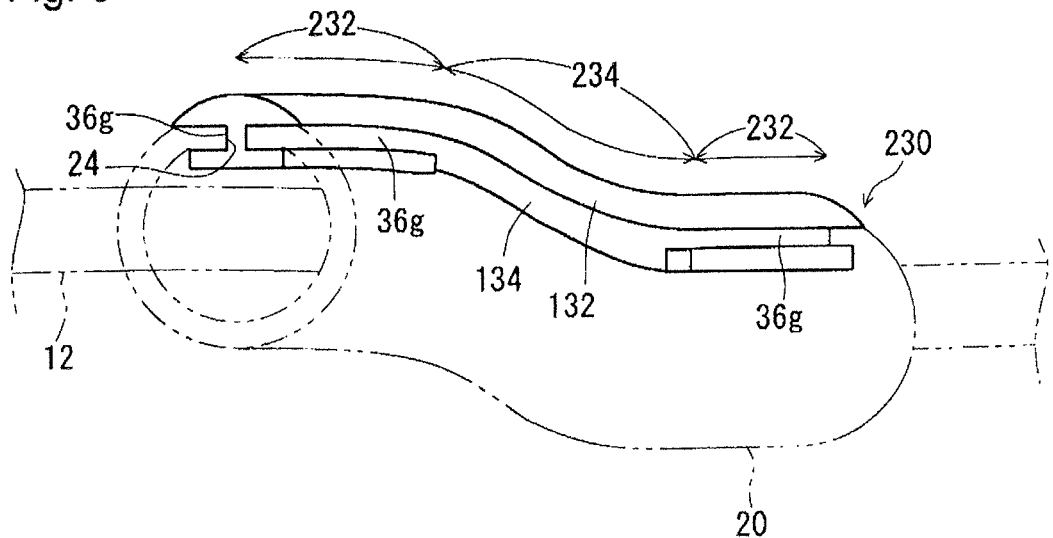
FIG. 6 is a schematic perspective view of a modified example of a path-maintaining member.

In this case, a path-maintaining member 230 according to a modified example as illustrated in FIG. 6 includes a first portion 232 that has the pair of concave grooves 36g and a second portion 234 that has the lid portion 132 and the protruding bar portion 134. The second portion 234 may be more sharply bent than the first portion 232. The second portion 234 being more sharply bent than the first portion 232 includes a case where a bending radius of the second portion 234 is smaller than a bending radius of the first portion 232 and a case where the second portion 234 is bent whereas the first portion 232 is in a linear shape. Here, the first portion 232 linearly extends on two longitudinal-direction end portions of the path-maintaining member 230 and the second portion 234 is bent into a gentle S shape in a longitudinal-direction middle portion of the path-maintaining member 230.

According to this modified example, for the portion where the path-maintaining member 230 is bent with a relatively small bending radius, the protruding bar portion 134 can be pushed into the slit 24 from the outer periphery side of the corrugated tube 20. Therefore, the operation of installing the path-maintaining member 230 can be easily performed. Further, the path-maintaining member 230 is formed in a relatively simple shape at a portion where the path-maintaining member 230 is relatively sharply bent. Therefore, there is an advantage that a relatively simple mold structure can be readily used.

Figure 7:
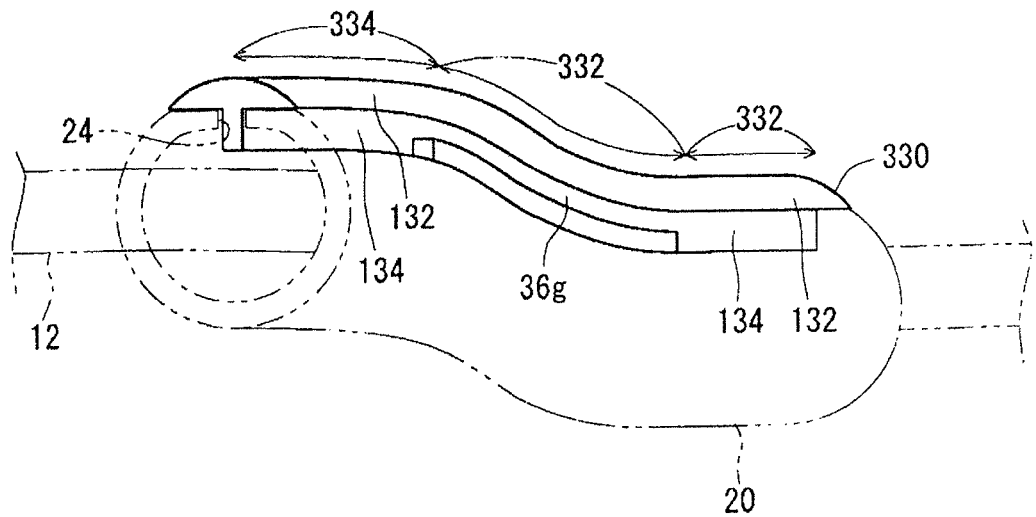
FIG. 7 is a schematic perspective view of another modified example of a path-maintaining member.

Further, a path-maintaining member 330 according to a modified example as illustrated in FIG. 7 includes a first portion 332 that has the pair of concave grooves 36g and a second portion 334 that has the lid portion 132 and the protruding bar portion 134. The first portion 332 may be more sharply bent than the second portion 334. The first portion 332 being more sharply bent than the second portion 334 includes a case where a bending radius of the first portion 332 is smaller than a bending radius of the second portion 334 and a case where the first portion 332 is bent whereas the second portion 334 is in a linear shape. Here, the second portion 334 linearly extends on two longitudinal-direction end portions of the path-maintaining member 330 and the first portion 332 is bent into a gentle S shape in a longitudinal-direction middle portion of the path-maintaining member 330.

According to this modified example, for the portion where the path-maintaining member 330 is relatively sharply bent, the edge portions of the corrugated tube 20 on both sides of the slit 24 are housed in the pair of concave grooves 36g. Therefore, an integrated state of the corrugated tube 20 and the path-maintaining member 330 can be more reliably maintained. Therefore, the bent state of the wire harness main body 12 can be more reliably maintained.

In the above embodiments and modified examples, examples are described in which the path-maintaining member 30/130/230/330 is arranged in the slit 24, but this is not necessarily required. It is also possible to fix the path-maintaining member 30 pre-formed in a predetermined bent shape to the corrugated tube 20 by tape winding and the like.

Further, for one wire harness main body 12, the path-maintaining members 30, 130, 230, 330 and the like described in the above embodiments and modified examples may be used in combination.

The configurations described in each of the above embodiments and modified examples can be combined as appropriate insofar as they do not contradict each other.

In the above, the present invention is described in detail. However, the above description is in all aspects for exemplary purposes and the present invention is not limited by the description. It is understood that numerous modified examples that are not exemplified can be envisioned without departing from the scope of the present invention.

The invention claimed is:

1. A corrugated tube assembly, comprising:
 a corrugated tube having annular convex portions and annular concave portions alternately formed along a longitudinal direction, the corrugated tube being provided with a path-maintaining member; and
 the path-maintaining member configured as an elongated member die-molded to maintain a shape at least a portion of which is bent along the longitudinal direction, and attached to the corrugated tube along the longitudinal direction, wherein
 a slit is formed on the corrugated tube along the longitudinal direction, and
 the path-maintaining member comprises:
  a first portion where a pair of concave grooves housing edge portions of the corrugated tube on both sides of the slit are formed; and
  a second portion comprising:
   a lid portion covering a portion of the corrugated tube on an outer side of the slit; and
   a protruding bar portion protruding at a width-direction center part of the lid portion and arranged in the slit, and
 the second portion is more sharply bent than the first portion in the longitudinal direction.

2. A wire harness including the corrugated tube assembly of claim 1, the wire harness comprising:
 a wire harness main body having at least one electric wire and which is inserted into the corrugated tube, which is provided with the path-maintaining member.

3. A corrugated tube assembly, comprising:
 a corrugated tube having annular convex portions and annular concave portions alternately formed along a longitudinal direction, the corrugated tube being provided with a path-maintaining member; and
 the path-maintaining member configured as an elongated member die-molded to maintain a shape at least a portion of which is bent along the longitudinal direction, and attached to the corrugated tube along the longitudinal direction, wherein
 a slit is formed on the corrugated tube along the longitudinal direction, and
 the path-maintaining member comprises:
  a first portion where a pair of concave grooves housing edge portions of the corrugated tube on both sides of the slit are formed; and
  a second portion comprising:
   a lid portion covering a portion of the corrugated tube on an outer side of the slit; and
   a protruding bar portion protruding at a width-direction center part of the lid portion and arranged in the slit, and
 the first portion is more sharply bent than the second portion in the longitudinal direction.

4. A wire harness including the corrugated tube assembly of claim 3, the wire harness comprising:
 a wire harness main body having at least one electric wire and which is inserted into the corrugated tube, which is provided with the path-maintaining member.

* * * * *